(12) United States Patent
Vijay et al.

(10) Patent No.: US 9,420,062 B2
(45) Date of Patent: Aug. 16, 2016

(54) DELIVERY TIME OPTIMIZATION (71) Applicant: LinkedIn Corporation, Mountain View, CA (US)

(72) Inventors: Ravi Kiran Holur Vijay, Mountain View, CA (US); Benjamin Arai, San Jose, CA (US); Mark Hull, San Jose, CA (US); Utku Irmak, San Francisco, CA (US); Pramod Khincha, Mountain View, CA (US); Samir M. Shah, San Francisco, CA (US); Ji Yan, Mountain View, CA (US); Lawrence Yuan, Campbell, CA (US)

(73) Assignee: LinkedIn Corporation, Mountain View, CA (US)

( * ) Notice: Subject to any disclaimer, the term of this patent is extended or adjusted under 35 U.S.C. 154(b) by 136 days.

(21) Appl. No.: 14/292,201

(22) Filed: May 30, 2014

(65) Prior Publication Data

US 2015/0350376 A1    Dec. 3, 2015

(51) Int. Cl.
*G06F 15/16*     (2006.01)
*H04L 29/08*     (2006.01)
*H04W 4/02*      (2009.01)
*H04L 12/58*     (2006.01)
*G06Q 50/00*     (2012.01)

(52) U.S. Cl.
CPC ............. *H04L 67/325* (2013.01); *G06Q 50/01* (2013.01); *H04L 51/32* (2013.01); *H04W 4/02* (2013.01); *H04W 4/021* (2013.01)

(58) Field of Classification Search
CPC ...... H04L 67/325; H04L 51/32; G06Q 50/01; H04W 4/02; H04W 4/021
See application file for complete search history.

(56) References Cited

U.S. PATENT DOCUMENTS

| | | | | |
|---|---|---|---|---|
| 8,260,314 | B2* | 9/2012 | Schroeder | H04L 51/14 455/456.1 |
| 2014/0006611 | A1* | 1/2014 | Perez | H04L 43/04 709/224 |
| 2014/0100952 | A1* | 4/2014 | Bart | G06Q 30/0264 705/14.53 |
| 2015/0271630 | A1* | 9/2015 | Ferrara | H04W 4/02 455/456.3 |

* cited by examiner

*Primary Examiner* — Jonathan Bui
(74) *Attorney, Agent, or Firm* — Schwegman Lundberg & Woessner, P.A.

(57) ABSTRACT

Techniques for optimizing a delivery time for the delivery of messages are described. According to various embodiments, members of an online social network service that are currently located in a particular geographic location (e.g., a particular time zone) are identified. Thereafter, messages (e.g., e-mails) are transmitted to the members at multiple local times (e.g., multiple times of the day). It is then determined that one or more of the messages that were transmitted at a particular local time have received a highest value for a response metric among the messages, the response metric indicating responses by the members to the messages. The particular local time is then classified as an optimum local message delivery time for the particular geographic location.

20 Claims, 9 Drawing Sheets

DELIVERY TIME OPTIMIZATION

TECHNICAL FIELD

The present application relates generally to data processing systems and, in one specific example, to techniques for optimizing a delivery time for the delivery of messages.

BACKGROUND

Online social network services such as LinkedIn® feature a wide range of products that are offered to millions of members. Further, such online social network services typically send a very large number of e-mails to members, where such e-mails may include information describing news, updates, features, products, offers, etc., associated with the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for optimizing a delivery time for the delivery of messages are described. In the following description, for purposes of explanation, numerous specific details are set forth in order to provide a thorough understanding of example embodiments. It will be evident, however, to one skilled in the art that the present invention may be practiced without these specific details.

According to various example embodiments, a delivery time optimization system is configured to identify the optimum time for delivering messages (e.g., e-mails) to users in different geographic locations (e.g., different time zones). The system may identify optimum local message delivery times by performing various message response experiments with respect to users in each location. For example, the system may send messages to users in each location at different (e.g., random) times of the day, and by analyzing how the users interact with the transmitted e-mails, the system may determine which times of the day produce the best responses to the messages (e.g., as measured by click through rates) in that time zone. For instance, in some embodiments, the system may identify a test segment/base of, for example, 5000 members of an online social network service that are currently located in a particular time zone. Thereafter, during an experiment cycle (e.g., one week), the system may transmit 5000 instances of an e-mail, one to each of the 5000 members, at random times of the day. In other words, each of the 5000 members may receive the e-mail once during the week-long experiment cycle at a random time of the day. By analyzing response metric associated with each of the e-mails, the system may determine that, for example, e-mails transmitted at a particular time of day (e.g., 2:35 PM) or at a particular time interval (e.g., between 1.30 PM and 4 PM) tend to receive much higher response metrics (e.g., click through rates) in comparison to the messages transmitted at other times of the day or at other time intervals. The delivery time optimization system may then classify such a time (or time interval) as an optimum local delivery time. In some embodiments, the delivery time optimization system may classify the optimum local delivery time as a time interval (e.g., a one-hour "bucket") that includes the original e-mail transmission time that was associated with the highest response metric. For example, if messages transmitted at 2:35 PM tend to have the best response metrics, the system may determine that the optimum local delivery time is 2 PM to 3 PM.

In some embodiments, the geographic locations described herein may correspond to any known type of location, such as a time zone, building, street, neighbourhood, suburb, city, county, state, region, country, latitude, longitude, etc. In some embodiments, the messages described herein may be any type of electronic message, including an e-mail, text message (e.g., a short messaging service (SMS) message, a multimedia messaging service (MMS) message, etc.), an instant message associated with an online social network (e.g., Facebook, LinkedIn, Wechat, WhatsApp, etc.), a chat message associated with an online chat service, and so on.

In some embodiments, the response metrics described herein may correspond to any type of metric for measurement of how a user interacts with or responds to a content item such as a message. For example, the response metric may correspond to an access rate indicating rates at which users open, view, or access a message (e.g., by clicking on the message in an inbox in order to open and view the message). Such an access rate may measure the number of access events in comparison to a number of impressions (e.g., the number of times the message was transmitted). The response metric may also correspond to a raw number of access events, a number of access events during a predetermined time interval, and so on. In some embodiments, the response metric may correspond to a click through rate indicating rates at which users click on some content within the message (e.g., a reference link that takes the user to a site). Such a click through rate may measure the number of clicks in comparison to a number of impressions (e.g., the number of times the message was rendered to users). The response metric may also correspond to a raw number of clicks, a number of clicks during a predetermined time interval, and so on. In some embodiments, the response metric may correspond to a reply rate indicating rates at which users reply to the message. Such a reply rate may measure the number of replies in comparison to a number of impressions (e.g., the number of times the message was rendered and viewed by users, or the number of times the message was transmitted to users). The response metric may also correspond to a raw number of replies, a number of replies to during a predetermined time interval, and so on. Similarly, other types of response metrics capturing other possible types of responses may be utilized (e.g., specific user interface movements such as swipes, expanding content, zooming in and out of content, conversions, deletions of content, unsubscribes, marking content as spam, hover responses, etc.).

After the delivery time optimization system determines optimum local delivery times for a particular geographic location, if the delivery time optimization system determines that a given member is located in the particular geographic location, the delivery time optimization system may adjust the message delivery preferences of that member to reflect the optimal local message delivery time. Accordingly, when a message is to be transmitted to that given member at the particular geographic location, the message may be transmitted at the optimal local message delivery time, based on these updated preferences.

In some embodiments, the delivery time optimization system may simply transmit e-mails at random times of the day during an experiment cycle, as described above. In other embodiments, the delivery time optimization system may transmit the e-mails at predetermined or fixed times of the day (as opposed to random times of the day). For example, the delivery time optimization system may display a user interface enabling a user of the delivery time optimization system to specify exact times when e-mails should be transmitted, or to specify that e-mails should be transmitted at fixed intervals (e.g., every second, every minute, every 30 minutes, every hour, etc.).

In some embodiments, the techniques described herein may be utilized to determine not only an optimum time of the day to transmit e-mails, but also an optimum day of the week to transmit e-mails. For example, the system may transmit e-mails to each of the 5000 members in the test base at the same time of the day (e.g., 10 AM) on a random weekday doing the given experiment cycle, and may analyze the results to determine if e-mails transmitted on a certain day of the week tend to produce greater response metrics.

In some embodiments, the delivery time optimization system may identify optimum local delivery times based on experiments performed on a small test base/segment of members of an online social network (e.g., a test base of 5% of members). The test base may represent members in different time zones in proportion to how members in the total member base are located in different time zones. For example, if half of all the members of the social network are located in time zone A and the other half of all the members are located in time zone B, then experimentation may be performed on 5% of all the members, where half of that 5% of members are in time zone A and the other half of that 5% of members are in time zone B. Thereafter, once the optimum local message delivery time is determined based on the experimentation on the test base, the message delivery preferences of the other members of the online social network may be automatically updated to indicate the optimum local message delivery times for each member, based on where that member is located. In this manner, experiments may be performed with respect to, for example, 5% of the member base of the social network continuously, while the results are continuously and automatically applied to the message delivery preferences of the other 95% of the member base of the social network.

In some embodiments, the techniques described above may be utilized to calculate not only an optimal local message delivery time, but also the second optimal local message delivery time, third optimal local message delivery time, fourth optimal local message delivery time, and so on. For example, the system may identify the times that have the second highest response metric, third highest response metric, fourth highest response metric, and so on. This may be beneficial if, for example, a situation arises where a message cannot be transmitted to a given member in a particular location at the corresponding optimum local message delivery time for that particular location, perhaps because delivery of the message at that time would violate a message campaign rule (e.g., by transmitting too many messages to the user during a given time interval, by transmitting too many messages to the user within a certain time of each other, etc.), or perhaps because there is a delivery failure with a message delivery system. In this situation, the delivery time optimization system may separate transmit that message to the user at the second optimum local message delivery time, as necessary. This approach may also be beneficial in a situation where two or more e-mails are to be transmitted to the user at the same time. In such case, the delivery time optimization system may identify the importance of each of the e-mails (e.g., by assigning important values to the emails based on pre-existing criteria identifying sample importance values associated with different types of e-mails), and the more important e-mail may be transmitted to the user at the optimum local message delivery time, while the second more important e-mail may be transmitted to the user at the second optimum local message delivery time, and so on.

The system may determine that a member is currently located in a particular time zone based on, for example, member profile attributes of the member (e.g., a user-specified country attribute, contact information, a current educational attribute, a current employer attribute), social activity information associated with the member (e.g., a "check-in" at a venue via a post on an online social network), geo-location information accessed from a mobile device of the member, IP address information obtained from login requests to a website received from the member, and so on.

In accordance with one example embodiment, the system may utilize a combination of member profile attributes and IP address login information associated with members in order to determine that the member is currently located in a particular time zone. For example, the system may first analyze member profile attributes of the member in order to determine if they are currently located in a particular country. For example, the system may identify whether a user-specified country attribute identifying a particular country is defined in the member profile information of the member (e.g., as a result of the member specifying their current country of residence when they opened a member account on the online social network service). Thereafter, the system may access publicly available time zone information indicating time zones associated with each of a plurality of countries. If the system determines that a single time zone is associated with the particular country, the system may determine that the member is currently located in that single time zone. On the other hand, if the system determines that multiple time zones are associated with the particular country, then the system may access the last IP address associated with the last member login request from that member (e.g., from the last time that member logged into a website). Based on this IP address, the system may determine a geographic location (e.g., a city) associated with the IP address, and a time zone associated with that geographic location, in order to ultimately identify the specific time zone (from among the multiple time zones in that country) that the particular member is currently located in.

Figure 1:
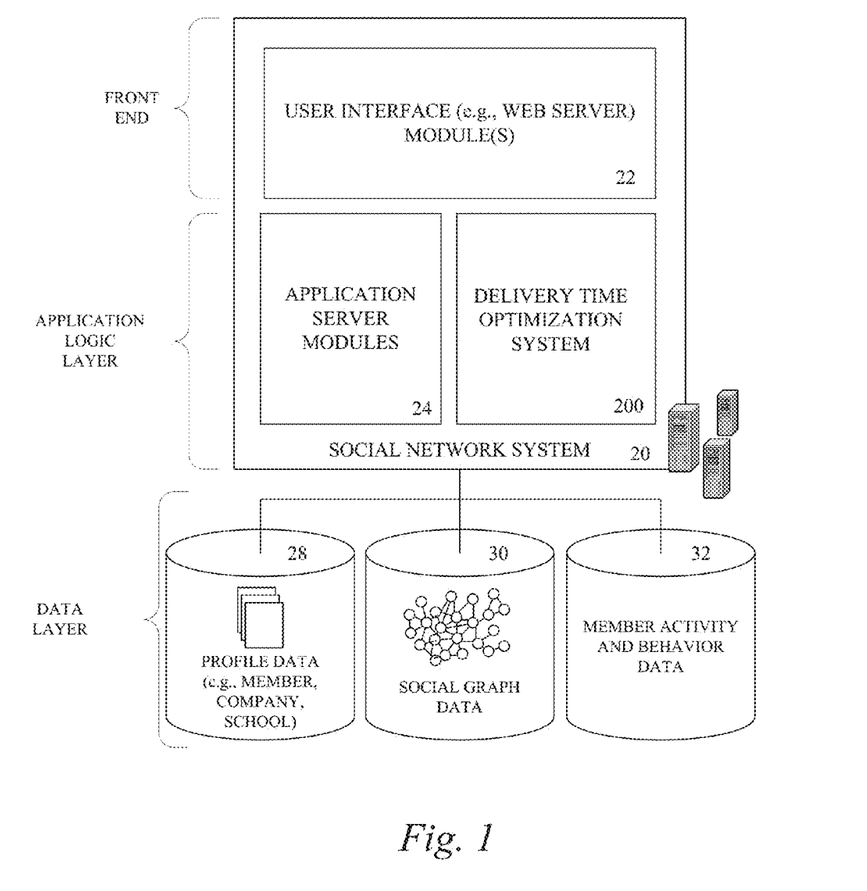
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a delivery time optimization system 200. The delivery time optimization system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
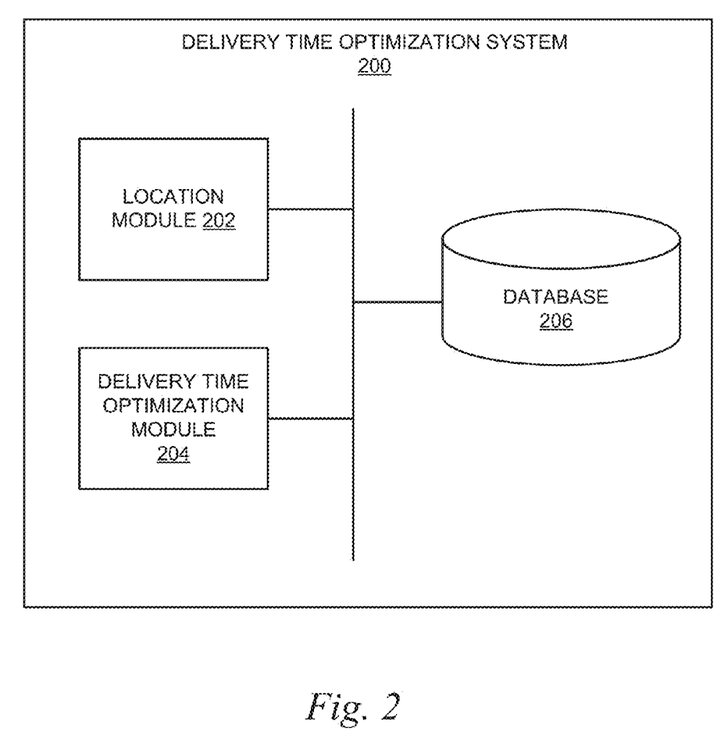
FIG. 2 is a block diagram of an example system, according to various embodiments.

Turning now to FIG. 2, a delivery time optimization system 200 includes a location module 202, a delivery time optimization module 204, and a database 206. The modules of the delivery time optimization system 200 may be implemented on or executed by a single device such as a delivery time optimization device, or on separate devices interconnected via a network. The aforementioned delivery time optimization device may be, for example, one or more client machines or application servers. The operation of each of the aforementioned modules of the delivery time optimization system 200 will now be described in greater detail in conjunction with FIG. 3.

Figure 3:
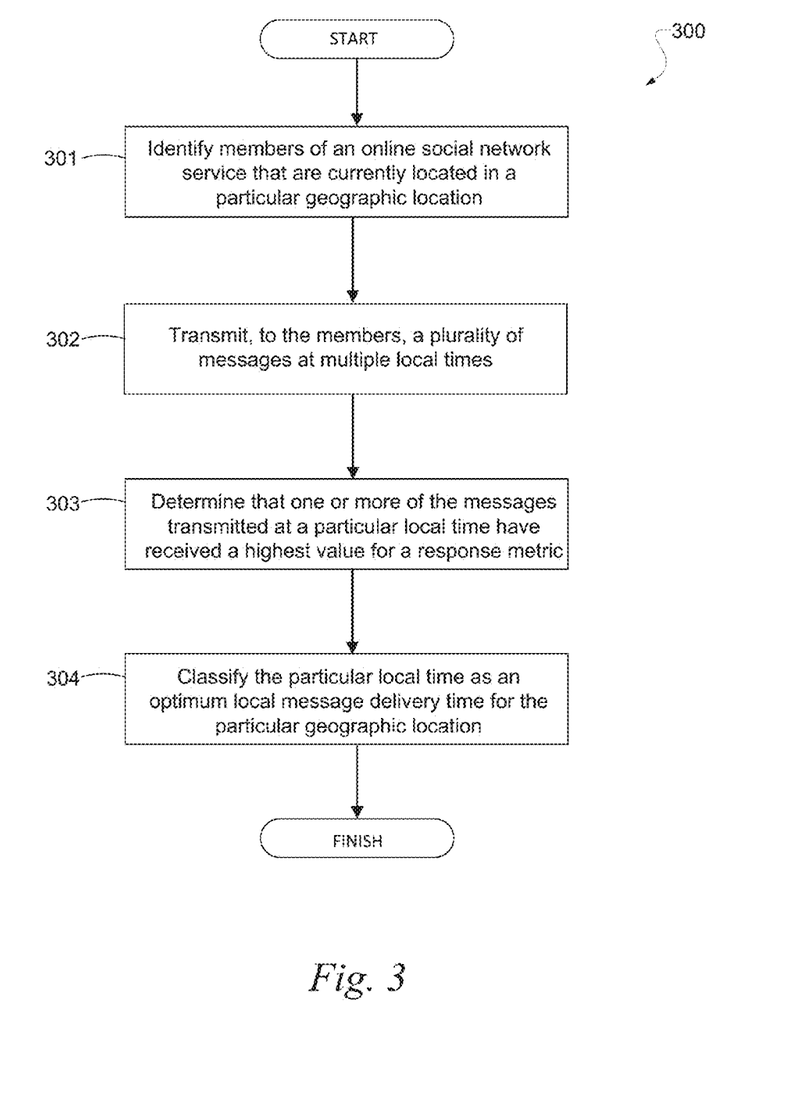
FIG. 3 is a flowchart illustrating an example method, according to various embodiments.

FIG. 3 is a flowchart illustrating an example method 300, according to various example embodiments. The method 300 may be performed at least in part by, for example, the delivery time optimization system 200 illustrated in FIG. 2 (or an apparatus having similar modules, such as one or more client machines or application servers). In operation 301 in FIG. 3, the location module 202 identifies a plurality of members of an online social network service that are currently located in a particular geographic location (e.g., a particular time zone). In operation 302 in FIG. 3, the delivery time optimization module 204 transmits, to the plurality of members, a plurality of messages at multiple local times (e.g., multiple local times of the day or multiple days of the week). As described herein, "local" time refers to the local time in the aforementioned particular geographic location (see operation 301). In some embodiments, the multiple local times are determined randomly. In operation 303 in FIG. 3, the delivery time optimization module 204 determines that one or more of the messages transmitted at a particular local time (e.g., a particular time of the day or a particular day of the week) have received a highest value for a response metric among the plurality of messages, the response metric (e.g., click through rate) indicating responses by the plurality of members to the plurality of messages. In operation 304 in FIG. 3, the delivery time optimization module 204 classifies the particular local time as an optimum local message delivery time for the particular geographic location, and stores the optimum local message delivery time (e.g., in the database 206).

Figure 4:
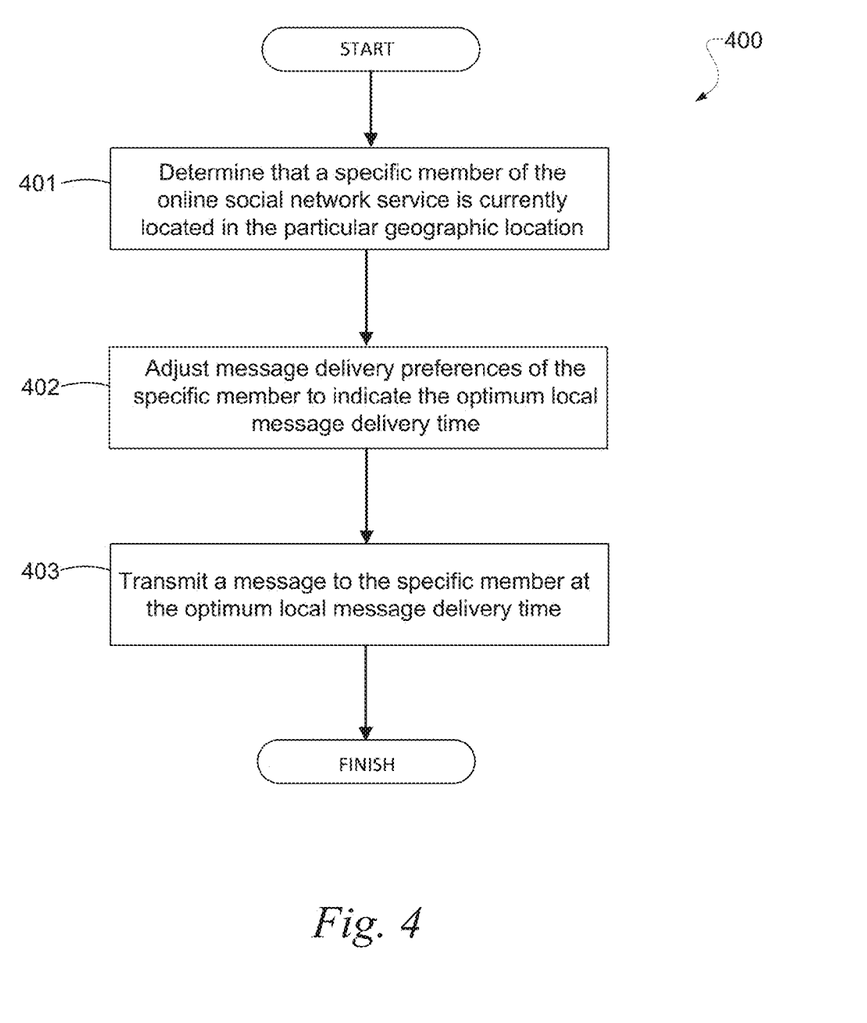
FIG. 4 is a flowchart illustrating an example method, according to various embodiments.

FIG. 4 is a flowchart illustrating an example method 400, consistent with various embodiments described above. In some embodiments, the method 400 may be performed after the method 300 in FIG. 3. The method 400 may be performed at least in part by, for example, the delivery time optimization system 200 illustrated in FIG. 2 (or an apparatus having similar modules, such one or more client machines or application servers). In operation 401, the delivery time optimization module 204 determines that a specific member of the online social network service is currently located in a particular geographic location (e.g., based on member profile attributes of the member such as a country attribute, company attribute, or school attribute, or based on a login IP address associated with the member, or based on geo-location information received from the member's mobile device, etc.). In operation 402, the delivery time optimization module 204 adjusts message delivery preferences (e.g., e-mail delivery preferences, text message delivery preferences, chat message delivery preferences, etc.) associated with the specific member to indicate the optimum local message delivery time for that geographic location. In operation 403, the delivery time optimization module 204 transmits a message to the specific member at the optimum local message delivery time, based on the updated message delivery preferences associated with the specific member. It is contemplated that the operations of method 400 may incorporate any of the other features disclosed herein. Various operations in the method 400 may be omitted or rearranged, as necessary. For example, the delivery time optimization module 204 may forgo adjusting e-mail delivery preferences (operation 402), and simply transmit a message to the specific member at the optimum local message delivery time (operation 403).

In some embodiments, the delivery time optimization system 200 may perform the operation 400 for a single member of an online social network service, or a group of members of the online social network service (e.g., a portion or all of the members). In some embodiments, the method 300 in FIG. 3 may be performed on a first group of members of the online social network service that are currently located in a particular geographic location (e.g., a test base of 5% of users at the location). Thereafter, once the optimum local message delivery time is determined pursuant to the method 300, the message delivery preferences of a second distinct group of members (that are also currently located in the particular geographic location) may be automatically updated to indicate the optimum local message delivery time. For example, the second group of members may be the remaining 95% of users at the location. In this manner, experiments may be performed with respect to, for example, 5% of relevant users continuously, while the results are continuously and automatically applied to the message delivery preferences of the other 95% of relevant users.

Figure 5:
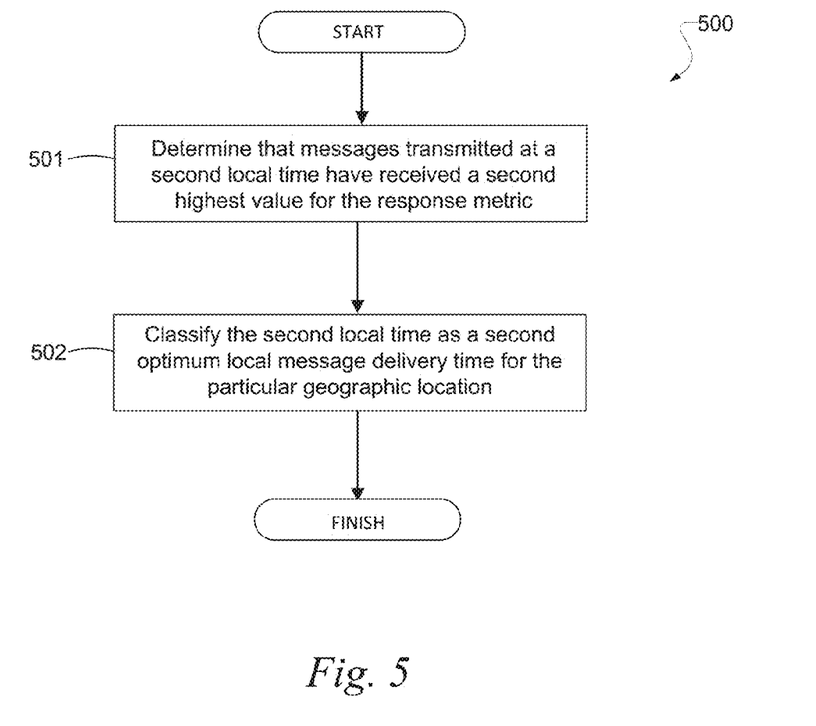
FIG. 5 is a flowchart illustrating an example method, according to various embodiments.

FIG. 5 is a flowchart illustrating an example method 500, consistent with various embodiments described above. The method 500 may be performed at least in part by, for example, the delivery time optimization system 200 illustrated in FIG. 2 (or an apparatus having similar modules, such one or more client machines or application servers). In operation 501, the delivery time optimization module 204 determines that one or more of the messages transmitted in operation 302 in FIG. 3 (to members located in a particular geographic location) at a second local time have received a second highest value for a response metric among the plurality of messages transmitted in operation 302 in FIG. 3. In operation 502, the delivery time optimization module 204 classifies the second local time as a second optimum local message delivery time for the particular geographic location. The delivery time optimization module 204 may also adjust message delivery preferences associated with members of the online social network service (that are currently located in the particular geographic location) to indicate the second optimum local message delivery time. It is contemplated that the operations of method 500 may incorporate any of the other features disclosed herein. Various operations in the method 500 may be omitted or rearranged, as necessary.

Figure 6:
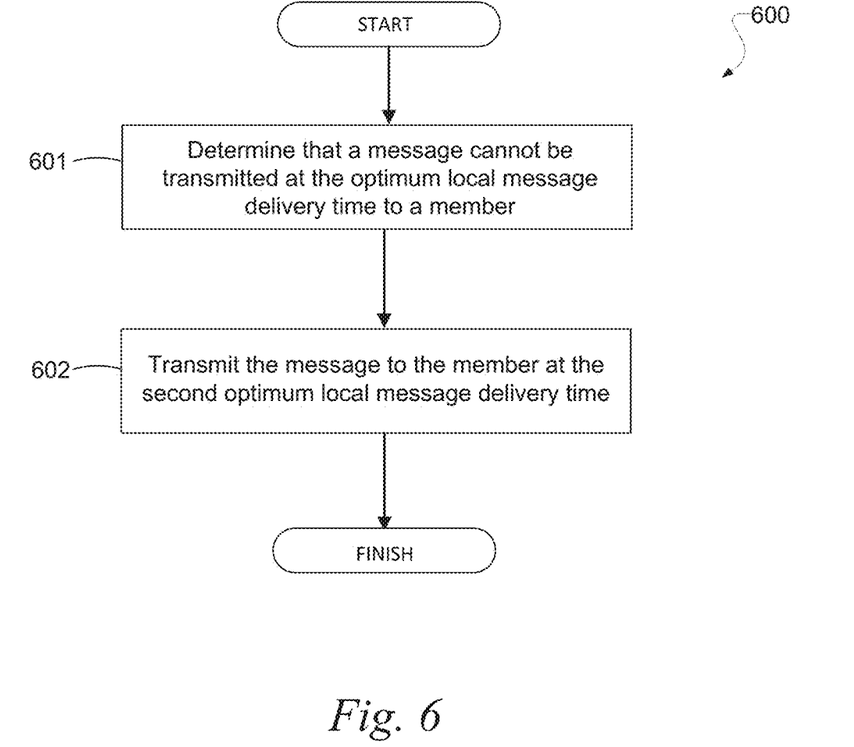
FIG. 6 is a flowchart illustrating an example method, according to various embodiments.

FIG. 6 is a flowchart illustrating an example method 600, consistent with various embodiments described above. In some embodiments, the method 600 may be performed after the method 500 illustrated in FIG. 5. The method 600 may be performed at least in part by, for example, the delivery time optimization system 200 illustrated in FIG. 2 (or an apparatus having similar modules, such one or more client machines or application servers). In operation 601, the delivery time optimization module 204 determines that a message cannot be transmitted at the optimum local message delivery time to a member of the online social network service located in a particular geographic location. In operation 602, the delivery time optimization module 204 transmits the message to the member at a second optimum local message delivery time associated with the particular location. It is contemplated that the operations of method 600 may incorporate any of the other features disclosed herein. Various operations in the method 600 may be omitted or rearranged, as necessary.

Figure 7:
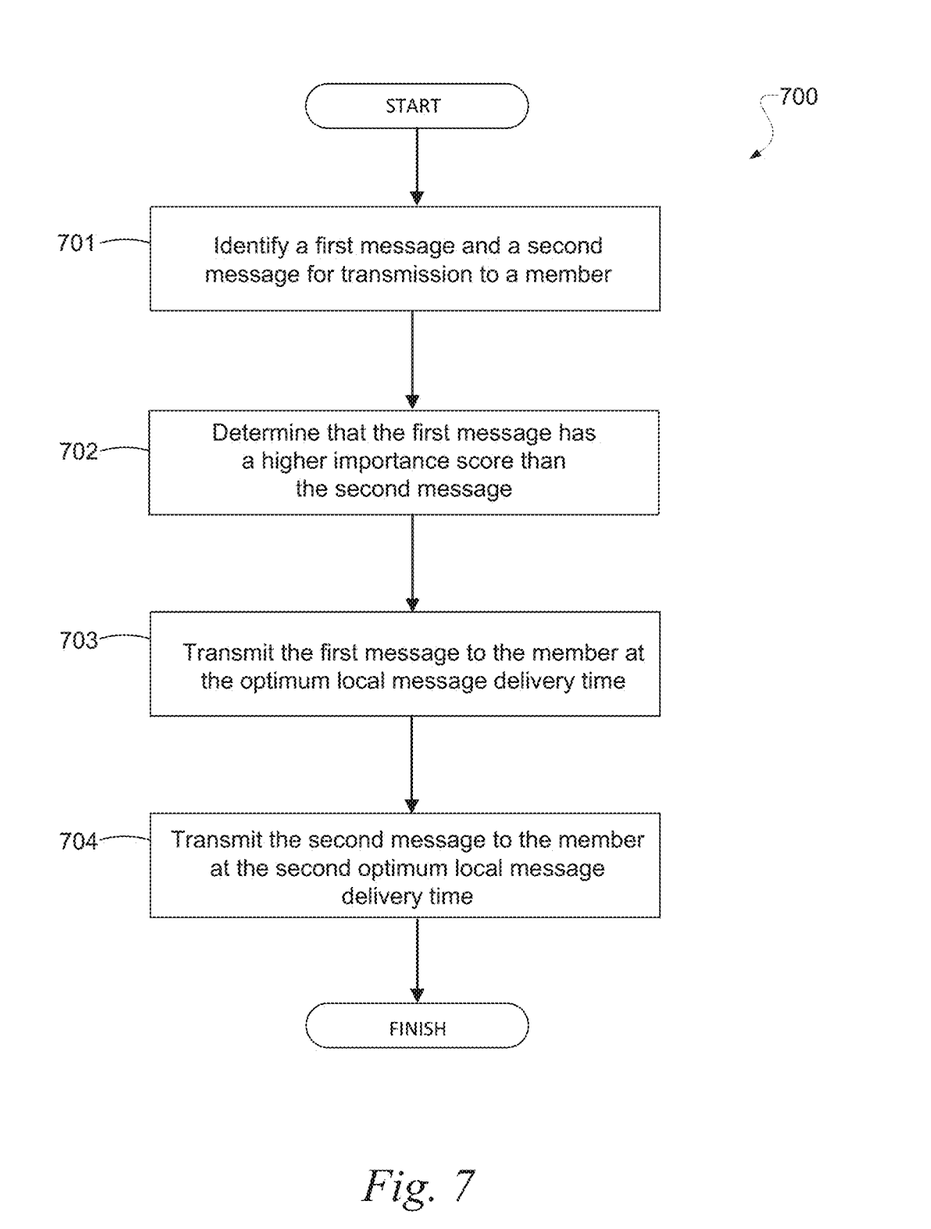
FIG. 7 is a flowchart illustrating an example method, according to various embodiments.

FIG. 7 is a flowchart illustrating an example method 700, consistent with various embodiments described above. In some embodiments, the method 700 may be performed after the method 500 illustrated in FIG. 5. The method 700 may be performed at least in part by, for example, the delivery time optimization system 200 illustrated in FIG. 2 (or an apparatus having similar modules, such one or more client machines or application servers). In operation 701, the delivery time optimization module 204 identifies a first message and a second message addressed for transmission to a member of the online social network service. In operation 702, the delivery time optimization module 204 determines that the first message has a higher importance score (or some other measure of priority) than the second message. In operation 703, the delivery time optimization module 204 transmits the first message to the member at the optimum local message delivery time. In operation 704, the delivery time optimization module 204 transmits the second message to the member at the second optimum local message delivery time. It is contemplated that the operations of method 700 may incorporate any of the other features disclosed herein. Various operations in the method 700 may be omitted or rearranged, as necessary.

Example Mobile Device

Figure 8:
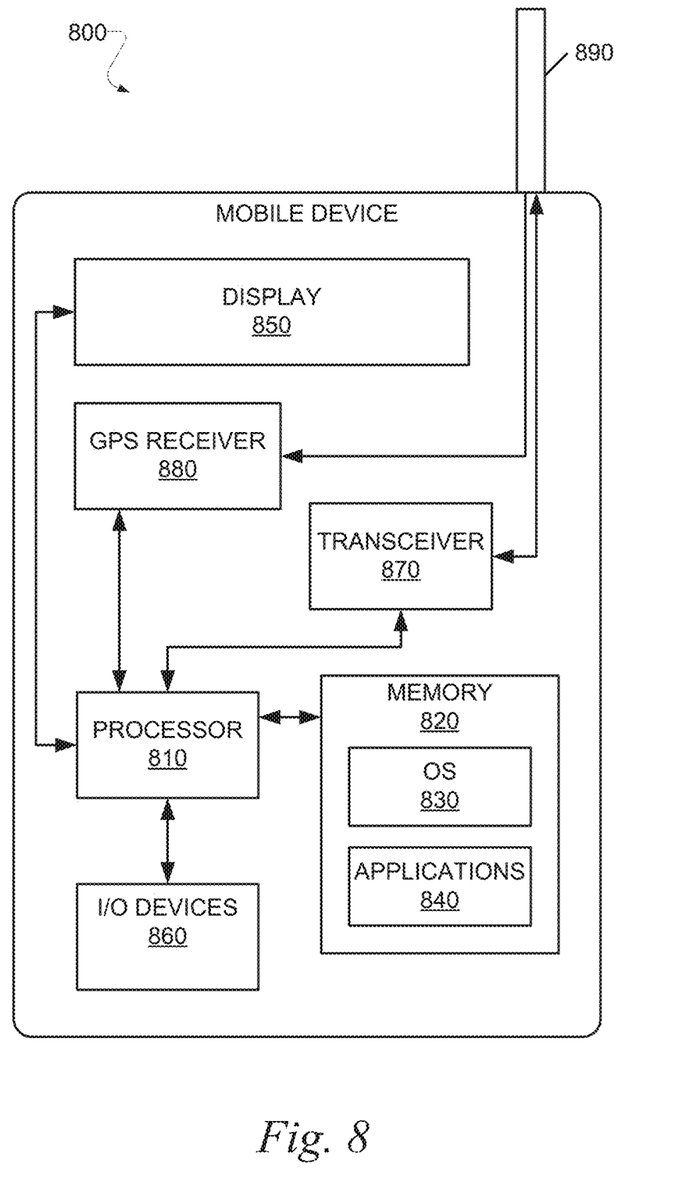
FIG. 8 illustrates an example mobile device, according to various embodiments.

FIG. 8 is a block diagram illustrating the mobile device 800, according to an example embodiment. The mobile device may correspond to, for example, one or more client machines or application servers. One or more of the modules of the system 200 illustrated in FIG. 2 may be implemented on or executed by the mobile device 800. The mobile device 800 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor 810. The memory 820 may be adapted to store an operating system (OS) 830, as well as application programs 840, such as a mobile location enabled application that may provide location based services to a user. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 800. Further, in some configurations, a GPS receiver 880 may also make use of the antenna 890 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
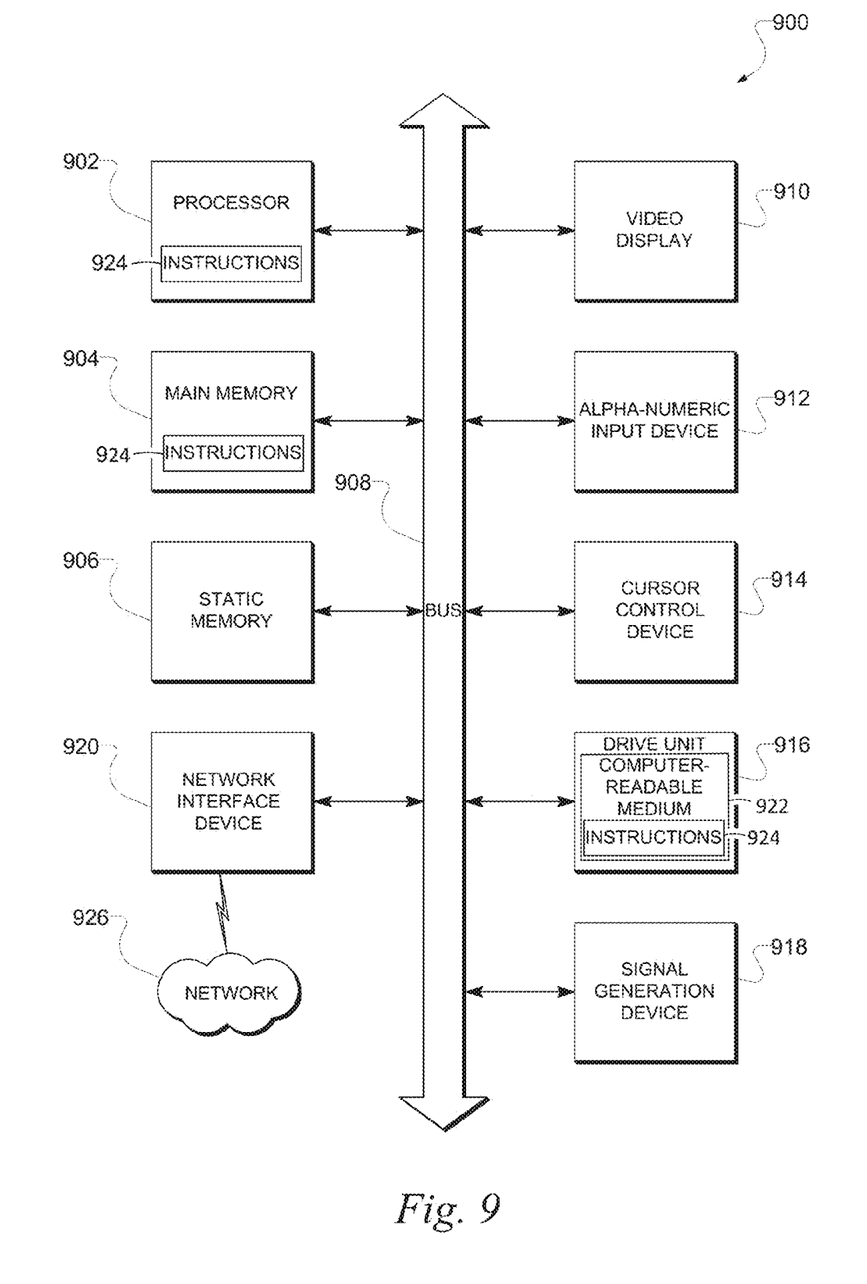
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   identifying a plurality of members of an online social network service that are currently located in a particular geographic location;
   transmitting, to the plurality of members, a plurality of messages at multiple local times;
   determining, using one or more processors, that one or more of the messages transmitted at a particular local time have received a highest value for a response metric among the plurality of messages, the response metric indicating responses by the plurality of members to the plurality of messages; and
   classifying the particular local time as an optimum local message delivery time for the particular geographic location.

2. The method of claim 1, wherein the particular geographic location corresponds to a particular time zone.

3. The method of claim 1, wherein the particular local time corresponds to a particular time of the day.

4. The method of claim 3, wherein the optimum local message delivery time corresponds to a predetermined time interval that includes particular time of the day.

5. The method of claim 4, wherein the predetermined time interval corresponds to a one hour time interval.

6. The method of claim 1, wherein the particular local time corresponds to a day of the week.

7. The method of claim 1, wherein the multiple local times are determined randomly.

8. The method of claim 1, further comprising:
   determining that a specific member of the online social network service is currently located in the particular geographic location; and
   adjusting message delivery preferences associated with the specific member to indicate the optimum local message delivery time.

9. The method of claim 8, further comprising:
   transmitting a message to the specific member at the optimum local message delivery time, based on the updated message delivery preferences associated with the specific member.

10. The method of claim 1, wherein each of the plurality of messages corresponds to at least one of an email message, a text message, a social network instant message, and a chat message.

11. The method of claim 1, wherein the response metric corresponds to a click through rate associated with one or more reference links included in the plurality of messages.

12. The method of claim 1, wherein the response metric corresponds to an access rate associated with viewing or opening the plurality of messages.

13. The method of claim 1, wherein the response metric corresponds to a reply rate associated with replying to the plurality of messages.

14. The method of claim 1, wherein the plurality of members of the online social network service correspond to a first group of members of the online social network service that are currently located in the particular geographic location, and
   wherein the method further comprises automatically adjusting message delivery preferences associated with a second group of members of the online social network service that are currently located in the particular geographic location to indicate the optimum local message delivery time.

15. The method of claim 1, further comprising:
   determining that one or more of the messages transmitted at a second local time have received a second highest value for the response metric among the plurality of messages; and
   classifying the second local time as a second optimum local message delivery time for the particular geographic location.

16. The method of claim 15, further comprising:
   determining that a message cannot be transmitted at the optimum local message delivery time to a member of the online social network service located in the particular geographic location; and
   transmitting the message to the member at the second optimum local message delivery time.

17. The method of claim 15, further comprising:
   identifying a first message and a second message for transmission to a member of the online social network service;
   determining that the first message has a higher importance score than the second message;
   transmitting the first message to the member at the optimum local message delivery time; and
   transmitting the second message to the member at the second optimum local message delivery time.

18. A system comprising:
   a machine including a memory and at least one processor;
   a location module configured to identify a plurality of members of an online social network service that are currently located in a particular geographic location; and
   a delivery time optimization module, executable by the machine, configured to:
      transmit, to the plurality of members, a plurality of messages at multiple local times;
      determine that one or more of the messages transmitted at a particular local time have received a highest value for a response metric among the plurality of messages, the response metric indicating responses by the plurality of members to the plurality of messages; and classify the particular local time as an optimum local message delivery time for the particular geographic location.

19. The system of claim 18, wherein the delivery time optimization module is further configured to:

determine that a specific member of the online social network service is currently located in the particular geographic location; and adjust message delivery preferences associated with the specific member to indicate the optimum local message delivery time.

20. A non-transitory machine-readable storage medium comprising instructions that, when executed by one or more processors of a machine, cause the machine to perform operations comprising:

identifying a plurality of members of an online social network service that are currently located in a particular geographic location;

transmitting, to the plurality of members, a plurality of messages at multiple local times;

determining that one or more of the messages transmitted at a particular local time have received a highest value for a response metric among the plurality of messages, the response metric indicating responses by the plurality of members to the plurality of messages; and classifying the particular local time as an optimum local message delivery time for the particular geographic location.

* * * * *